United States Patent
Am et al.

(10) Patent No.: US 12,236,087 B2
(45) Date of Patent: Feb. 25, 2025

(54) SYSTEMS AND METHODS FOR SUPPORTING NVME SSD REBOOTLESS FIRMWARE UPDATES

(71) Applicant: Dell Products, L.P., Round Rock, TX (US)

(72) Inventors: Manjunath Am, Bangalore (IN); Rama Rao Bisa, Bangalore (IN); Pavan Kumar Gavvala, Bangalore (IN); Mahesh Babu Ramaiah, Bangalore (IN); Naveen Karthick Chandrasekaran, Bangalore (IN); Darshan Hebbar, Sagar (IN); Deepaganesh Paulraj, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 269 days.

(21) Appl. No.: 17/935,645

(22) Filed: Sep. 27, 2022

(65) Prior Publication Data

US 2024/0103720 A1    Mar. 28, 2024

(51) Int. Cl.
    *G06F 8/656*      (2018.01)
    *G06F 3/06*      (2006.01)

(52) U.S. Cl.
    CPC .......... *G06F 3/0607* (2013.01); *G06F 3/0634* (2013.01); *G06F 3/0653* (2013.01); *G06F 3/0679* (2013.01); *G06F 8/656* (2018.02)

(58) Field of Classification Search
None
See application file for complete search history.

(56) References Cited

U.S. PATENT DOCUMENTS

| | | | |
|---|---|---|---|
| 8,260,841 B1 * | 9/2012 | Maity | G06F 11/3093 709/202 |
| 11,074,064 B1 * | 7/2021 | Hm | G06N 5/01 |
| 11,126,725 B2 * | 9/2021 | Suryanarayana | G06F 21/572 |
| 2013/0268922 A1 * | 10/2013 | Tiwari | G06F 9/4418 717/168 |
| 2014/0189673 A1 * | 7/2014 | Stenfort | G06F 8/654 717/170 |
| 2018/0101376 A1 * | 4/2018 | Olarig | G06F 8/63 |
| 2019/0179554 A1 * | 6/2019 | Pioch | G06F 3/064 |
| 2020/0218545 A1 * | 7/2020 | Ganesan | G06F 9/4411 |
| 2022/0334718 A1 * | 10/2022 | Kim | G06F 9/4401 |
| 2022/0398091 A1 * | 12/2022 | Mugunda | G06F 8/654 |

* cited by examiner

*Primary Examiner* — Marina Lee
(74) *Attorney, Agent, or Firm* — Fogarty LLP

(57) ABSTRACT

Embodiments of systems and methods to provide a firmware update to devices configured in a redundant configuration in an Information Handling System (IHS) are disclosed. In an illustrative, non-limiting embodiment, an IHS may include computer-executable instructions to receive a firmware update image associated with the storage unit, receive an indication that the storage unit requires a reboot of the IHS, and when the storage unit is experiencing minimal I/O usage, reset the storage unit using the firmware update image. The firmware update image is configured to perform rebootless firmware updates on the storage unit.

18 Claims, 5 Drawing Sheets

SYSTEMS AND METHODS FOR SUPPORTING NVME SSD REBOOTLESS FIRMWARE UPDATES

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

Nowadays, software updates are typically made available on one or more download sites as soon as the software provider can produce them. In this manner, software providers can be more responsive to critical flaws, security concerns, and general customer needs. To update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer.

SUMMARY

Embodiments of systems and methods to provide a firmware update to devices configured in a redundant configuration in an Information Handling System (IHS) are disclosed. In an illustrative, non-limiting embodiment, an IHS may include computer-executable instructions to receive a firmware update image associated with the storage unit, receive an indication that the storage unit requires a reboot of the IHS, and when the storage unit is experiencing minimal I/O usage, reset the storage unit using the firmware update image. The firmware update is configured to perform rebootless firmware updates on the storage unit.

According to another embodiment, a Non-Volatile Memory Express (NVMe)-based rebootless firmware update method includes the steps of receiving a firmware update image associated with a storage unit, the firmware update image is configured to perform rebootless firmware updates on the storage unit, which is configured to be updated with firmware at an ongoing basis, the storage unit conforming to a NVMe specification, receiving an indication that the storage unit requires a reboot of an Information Handling System (IHS) in which the storage unit is configured, and when the NVMe storage unit is experiencing minimal I/O usage, resetting the storage unit using the firmware update image.

According to yet another embodiment, a memory storage device is configured with program instructions that, upon execution by an Information Handling System (IHS), cause the IHS to receive a firmware update image associated with a storage unit, the firmware update image is configured to perform rebootless firmware updates on the storage unit, the storage unit conforming to a Non-Volatile Memory Express (NVMe) specification, receive an indication that the storage unit requires a reboot of the HIS, and when the storage unit is experiencing minimal I/O usage, reset the storage unit using the firmware update image.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
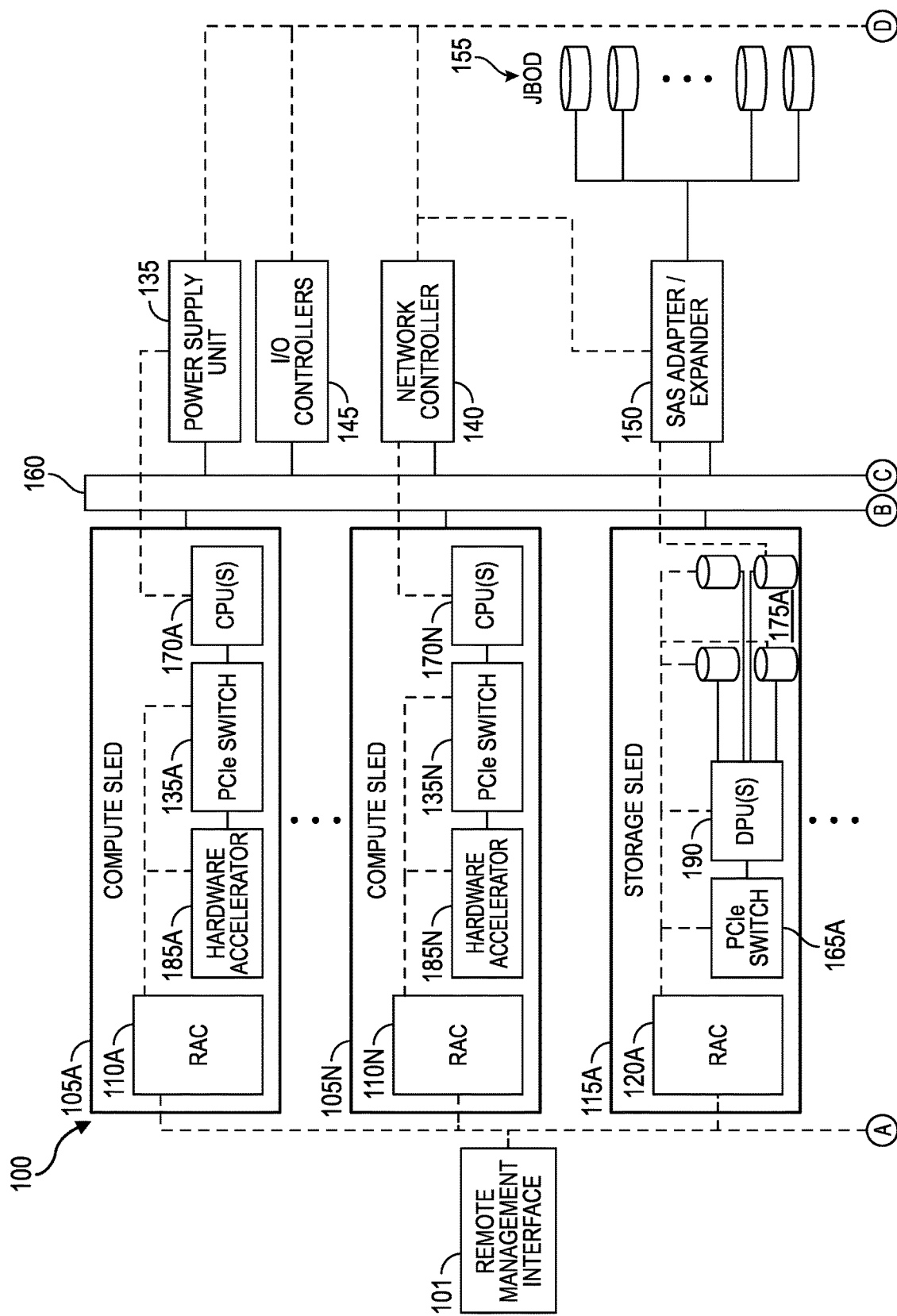
FIGS. 1A and 1B illustrate certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Firmware updates of server components is an important aspect of the life cycle management of an Information Handling System (IHS), (e.g., server, host, etc.). Traditional means of updating IHS devices have involved migrating the workloads running on the host Operating System (OS), creating a reboot job, rebooting the IHS, and performing the firmware update. Additionally, the IHS is again rebooted to activate the new firmware on the IHS components. This process, however, may not be customer friendly as the IHS is often required to be down for the firmware update process, thus impacting business. Because IHSs are forced to reboot to perform the firmware updates, customers often wait for its maintenance cycle (e.g., maintenance window) to update the IHS components, thus missing the new firmware features, security fixes, performance improvements, and the like. As such, rebootless updates may be an important aspect of efficient computer operations. Using rebootless updates, users may be enabled with performing the updates without rebooting the servers and get more useful features above what today's industry specifications can provide.

Customers often upgrade the firmware in the IHSs of a data center for assorted reasons, such as to meet compliance policies, to take advantage of new features, enhancements to the IHS, deploy security fixes, and the like. IHSs that are NVMe-MI/PLDM Specification compliant can take advantage of updating firmware to all IHSs in a system or in a cluster without rebooting the IHSs. Devices that support NVMe offer an option for a Remote Access Controller (RAC) to update the firmware without rebooting the IHS. Thus, downtime is often not incurred during the firmware update process. The RAC may be configured to provide out-of-band management facilities for an IHS, even if it is powered off, or powered down to a standby state. The RAC may include a processor, memory, and an out-of-band network interface separate from and physically isolated from an in-band network interface of the IHS, and/or other embedded resources. In certain embodiments, the RAC may include or may be part of a Remote Access Controller (e.g., a DELL Remote Access Controller (DRAC) or an Integrated DRAC (iDRAC)).

The RAC may support rebootless firmware updates for devices, such as non-volatile storage (e.g., hard disks, Solid State Drives (SSDs), etc.), Network Interface Cards (NICs), Graphical Processing Units (GPUs), RACs, Hardware RAID (HWRAID) devices, and the like. With the rebootless feature, when a firmware update image is uploaded using a RAC user interface, all the devices supported by the firmware update image may be automatically selected and updated using rebootless update methods in the real-time without rebooting the IHS. The RAC may implement a Platform Management Components Intercommunication (PMCI) interface stack that is provided by the Distributed Management Task Force (DMTF), and specifies a Management Component Transport Protocol (MCTP) specifying how data travels over certain physical layers, such as the peripheral component interconnect express (PCIe) and I2C/SMBus. Additionally, the PMCI interface stack may further include the Platform Level Data Model (PLDM) protocol that enables information to travel over the MCTP transport layer and can be used for platform management, such as firmware updates.

As mentioned previously, the NVMe-MI and PLDM firmware update specifications provide a way for the RAC to transfer the firmware update images and activate the new firmware update images without the need for a power cycle/server reboot. Though transfer of the firmware update image is often possible without the need for a reboot, it may not necessarily be able to be activated without being rebooted. The storage unit which claims rebootless update capability before the firmware image transfer, can change its capability claims after the firmware update image is completely transferred and verified. One reason for such a scenario may include the fact that one or more critical component image portions might have changed in the new firmware update image relative to the existing firmware image on the device and as such, the storage units cannot activate the new firmware update image without a power cycle/reboot of the server.

Certain IHSs may be configured with multiple types of NVMe Solid State Drives (SSDs) (e.g., multiple vendors and multiple models of each vendor) in an IHS, and the RAC will identify those storage devices having rebootless firmware update capability during the inventory phase (including hot plug case) of NVMe SSDs. There are situations where some NVMe SSDs support rebootless firmware update, and some do not. For storage devices that do not support rebootless firmware update capability, a legacy UEFI method may be used to update those NVME SSDs.

Conventionally, when a firmware update image is uploaded to the RAC, it reads the rebootless/self-contained image activation capability of the storage unit, and schedules a firmware update to be performed immediately if the device claims a rebootless update capability. The user may think they can update the firmware without server reboot given its rebootless update capability claim. But sometimes after the image is transferred, the storage unit may request for reboot of the server, thus potentially mis-informing the user unintentionally, and leading to a bad customer experience. For such scenarios, a Lifecycle Control Log (LCL) may be updated to log the fact that the IHS needs to be rebooted to activate the new firmware image on these NVMe SSDs. But this is not a good customer experience for users who expected that NVMe SSDs would indeed support rebootless updates.

It has been discovered by the inventors of the present case that, even though the NVMe storage unit states that a system reboot is required, a sideband communication link associated with the NVMe storage unit may be used to reset the storage unit without the need for a reboot of the entire IHS. Nevertheless, it would be beneficial to ensure that little or no I/O operations are currently pending to avoid any possibility of disk corruption that may otherwise be encountered when an ongoing I/O operation is prematurely halted. As will be described in detail herein below, embodiments of the present disclosure provide a system and method to support NVMe storage device rebootless firmware updates that may not require a reboot of the IHS.

Figure 1B:
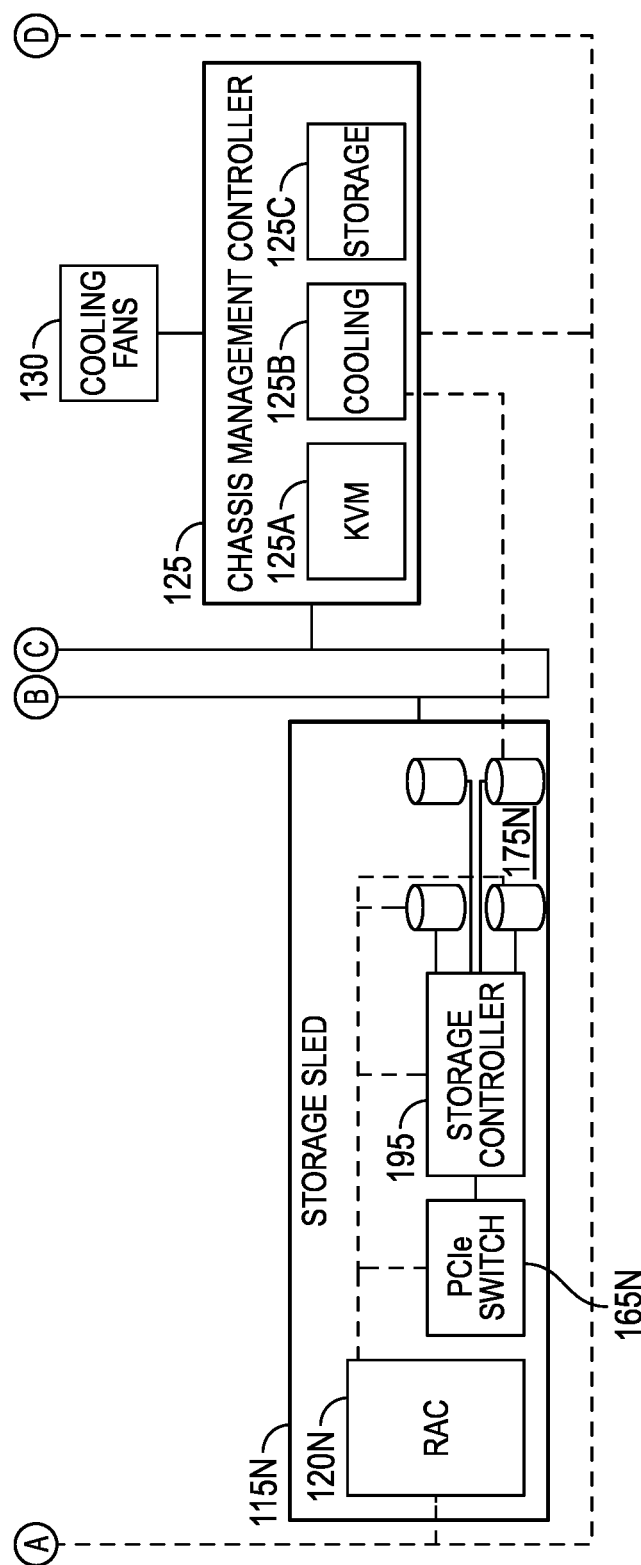

FIGS. 1A and 1B illustrate certain components of a chassis 100 comprising one or more compute sleds 105*a-n* and one or more storage sleds 115*a-n* that may be configured to implement the systems and methods described according to one embodiment of the present disclosure. Embodiments of chassis 100 may include a wide variety of hardware configurations in which one or more sleds 105*a-n*, 115*a-n* are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans 130 that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
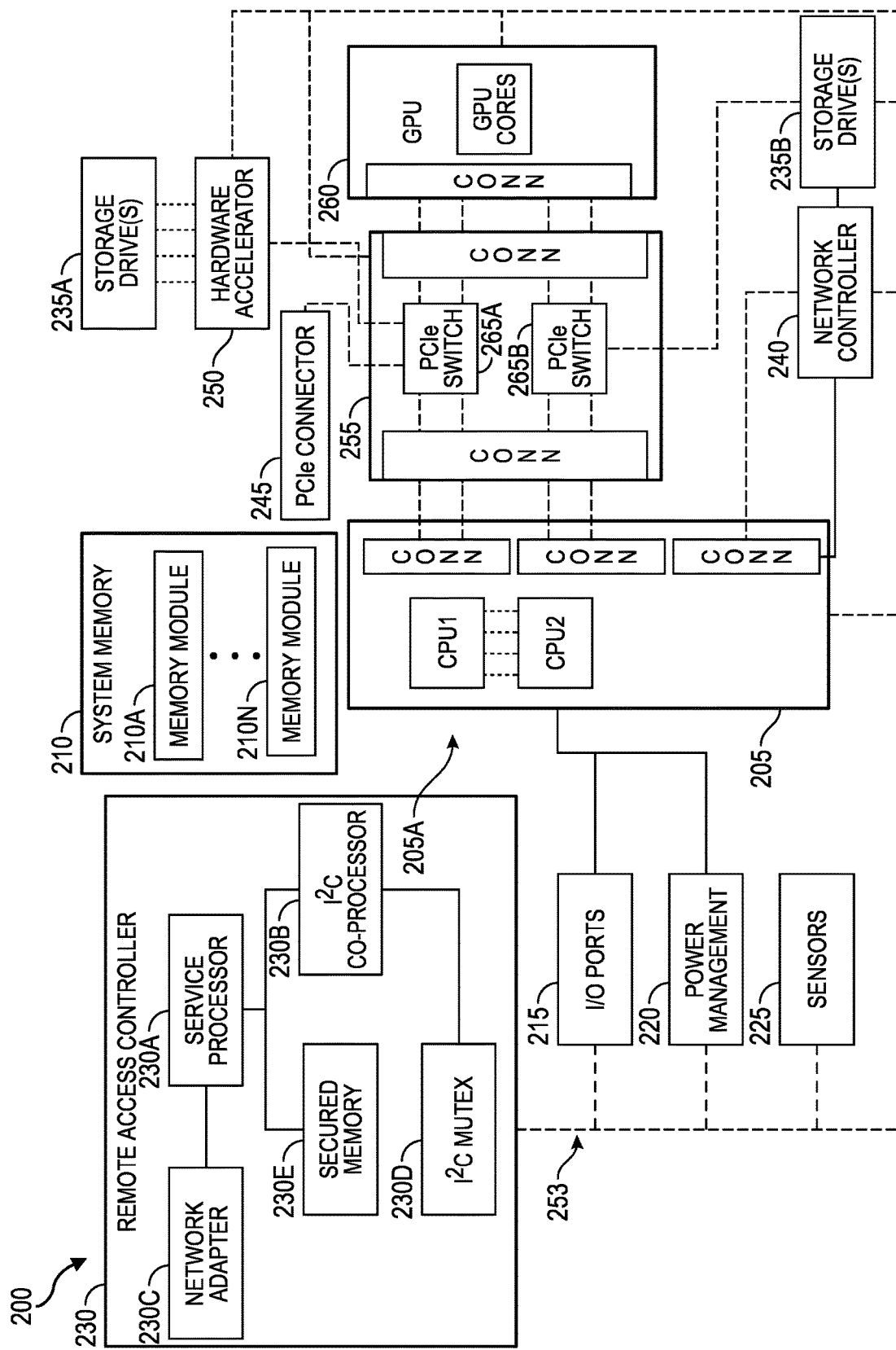
FIG. 2 illustrates an example of an IHS configured to implement systems and methods described herein according to one embodiment of the present disclosure.

In certain embodiments, each individual sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management firmware functions, remote access controllers 110a-n may utilize both in-band and sideband (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sled 105a-n, 115a-n. In addition, each remote access controller 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed in chassis 100 and/or may be installed elsewhere within a rack that houses the chassis 100. In certain scenarios, such storage resources (e.g., JBOD155) may be accessed via a SAS expander 150 that is coupled to the backplane 160 of the chassis 100. The SAS expander 150 may support connections to a number of JBOD (Just a Bunch of Disks) storage resources 155 that, in some instances, may be configured and managed individually and without implementing data redundancy across the various drives. The additional storage resources may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n or other type of server, such as a 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses.

For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, SmartNIC, GPU and/or FPGA, that may be a connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator 250 may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized to support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed resources 205, 235a-b, 240, 250, 255, 260 of the IHS 200. The I2C co-processor 230b may be a specialized co-processor or micro-controller that is configured to implement an I2C bus interface used to support communications with managed resources 205, 235a-b, 240, 250, 255, 260 of HIS 200. In some embodiments, the I2C co-processor 230b may be an integrated circuit on the same die as the service processor 230a, such as a peripheral system-on-chip feature that may be provided by the service processor 230a. The I2C sideband bus 253 is illustrated as single line in FIG. 2.

However, sideband bus 253 may be comprised of multiple signaling pathways, where each may be comprised of a clock line and data line that couple the remote access controller 230 to I2C endpoints (e.g., managed resources 205, 235a-b, 240, 250, 255, 260).

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
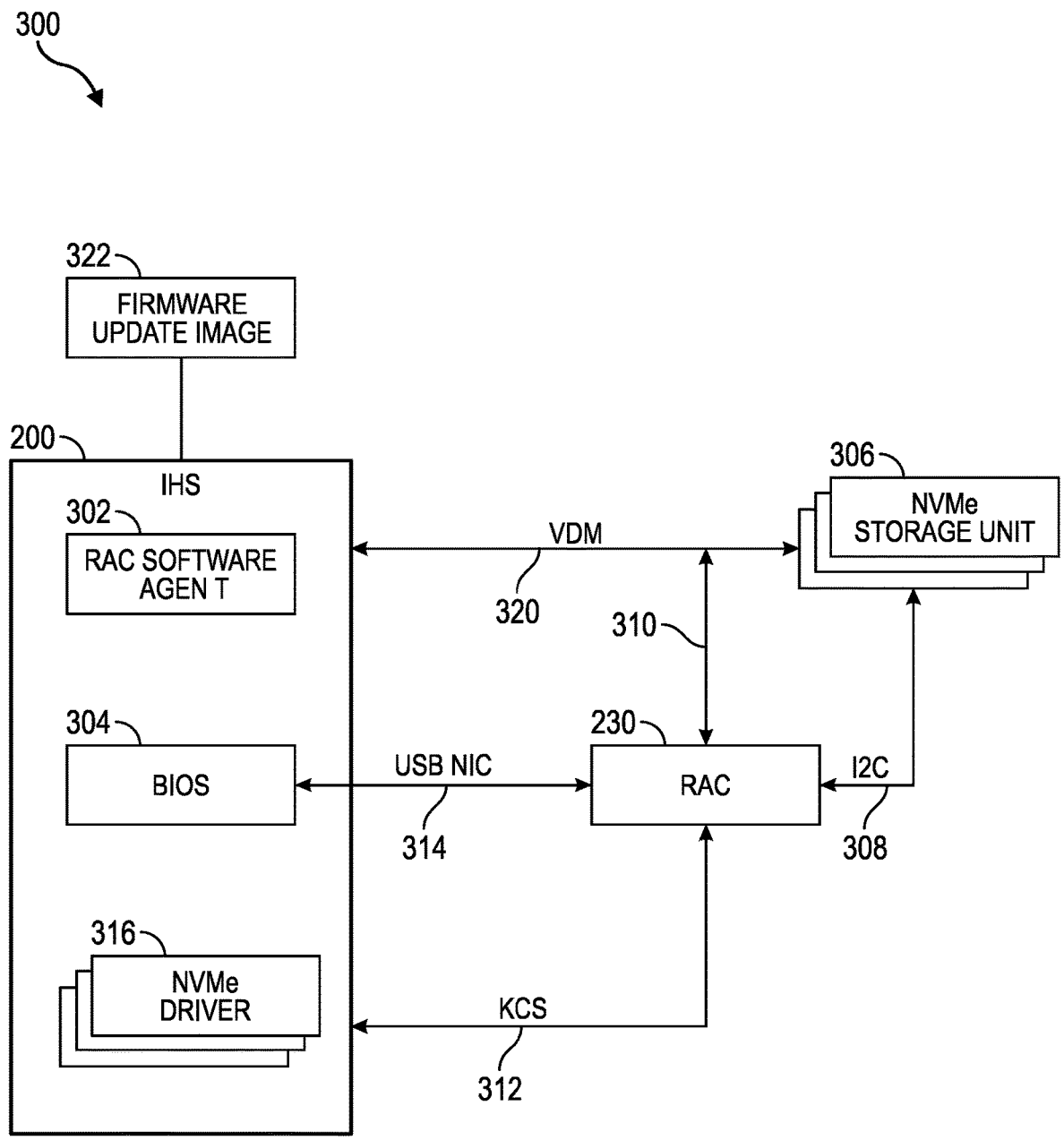
FIG. 3 is a diagram illustrating several components of an example associated IHS showing how those components may interact with one another for implementing a NVMe-based rebootless firmware update system according to one embodiment of the present disclosure.

FIG. 3 is a diagram 300 illustrating several components of an example associated IHS 200 showing how those components may interact with one another for implementing a NVMe-based rebootless firmware update system 300 according to one embodiment of the present disclosure. The IHS 200 is shown with a RAC software agent 302 and a basic input output system (BIOS) 304, and one or more device drivers 316 that are each associated with one of multiple NVMe storage units 306.

The RAC 230 may communicate with each of multiple NVMe storage units 306 via an i2c connection 308 such as described above. In other embodiments, the RAC 230 may communicate with each of the NVMe storage units 306 using other communication protocols, such as i3c SENSEWIRE connections, or serial peripheral interface (SPI) based connections. Additionally, the RAC 230 may also communicate with each of the NVMe storage units 306 through the system bus 320 using a Management Component Transport Protocol (MCTP) PCIe vendor defined message (VDM) channel 310. The RAC 230 may also communicate with the IHS 200 through the PCIe VDM channel 310, a Keyboard Controller Style (KCS) channel 312, and/or a USB NIC channel 314. The KCS channel 312 is provided as part of an intelligent platform management interface (IPMI) specification. In general, the IPMI specification defines several system interfaces for local access from the RAC software agent 302 and BIOS 304 to the RAC 230 of which the KCS protocol provides an ideal connection that does not require authentication for its operation.

Each NVMe storage unit 306 may be any IHS configurable device that conforms to a Non-Volatile Memory Express (NVMe) specification, such as a Half Height, Half Length (HHHL) storage unit, a full Height, Half Length (FHHL) storage unit, an NVMe Solid State Drive (SSD), a NVMe SSD (version M.2) and so on. For example, the NVMe storage units 306 may include those configured in storage drive 235b, those that are configured on a storage sled 115a-n, and/or storage drives 155 configured in a JBOD, such as described herein above with reference to FIGS. 1 and 2. Some, most, or all NVMe storage units 306 communicate with the IHS 200 via system bus 320, which in one embodiment, may include a Peripheral Component Interconnect Express (PCIe) bus.

A RAC 230 is provided to manage topology aware firmware updates to the NVMe storage units 306. While the present disclosure describes a RAC for managing the firmware updates, it should be appreciated that in other embodiments, the CPU 205, GPU 260, and/or Chassis Management Controller 125 may be configured to perform such tasks without departing from the spirit and scope of the present disclosure. The RAC 230 communicates with the IHS 200 via a RAC software agent 302. The RAC software agent 302 is a lightweight software service that is executed on the host IHS 200 to integrate certain operating system (OS) features with the RAC 230. The RAC software agent 302 provides OS-related information to the RAC 230, and may add capabilities such as LC log event replication into the OS log, WMI support (including storage), RAC SNMP alerts via OS, RAC hard reset and remote full Power Cycle. For example, the RAC software agent 302 may be an iDRAC Service Module (iSM) that is configured to operate with the integrated Dell remote access controller (iDRAC), which are both provided by DELL TECHNOLOGIES.

The IHS 200 may receive a firmware update image 322 that is to be installed on one or more NVMe storage units 306, and manage rebootless firmware updates for the supported NVMe devices. The RAC 230 will identify those storage devices having rebootless firmware update capability during the inventory phase and hot plug phase of the NVMe SSD's configuration. There are situations where some NVMe SSDs support rebootless firmware update, while others do not. For storage devices that do not support rebootless firmware update capability, the RAC 230 may utilize a legacy UEFI procedure to update those NVME SSDs.

As mentioned previously, when a firmware update image 322 is uploaded to the RAC 230, it reads the rebootless/self-contained image activation capability of the NVMe storage units 306, and schedules a firmware update to be performed immediately if the NVMe storage units 306 claims to possess the rebootless update capability. Although the user may think they can update the firmware without a server reboot given its rebootless update capability claim, sometimes after the image is transferred, the NVMe storage units 306 may request for reboot of the IHS 200. In such cases, when any firmware update image 322 requires a reboot to activate with new firmware, the RAC 230 may perform a NVMe sub-system reset or BPAPI based reset of NVMe SSD when there is relatively little read/write traffic going through the NVMe storage unit 306. In one embodiment, the RAC 230 may be configured to trigger the reset based on a specified level (e.g., less than 5%) of read/write traffic happening to the respective NVMe SSDs. In another embodiment, the specified level may be configurable by the user.

For NVMe storage units 306 that do not support PCIe VDM/NVMe-MI based Rebootless update, the RAC 230 may schedule a reboot job and update all the NVMe SSDs using conventional firmware updating techniques (e.g., Firmware Management Protocol (FMP)) or other suitable methods. Additionally, the device monitoring modules in the RAC 230 can register a callback to get the new firmware version notification such that the call back will be called after updating the firmware with the list of NVMe SSDs that are updated with new firmware.

In one embodiment, the RAC 230 may determine a time window when the NVMe storage units 306 are experiencing minimal usage, such as when a processing load on the NVMe storage units 306 goes below a specified threshold, and reset the NVMe storage units 306 at that time so that the new firmware update image 322 can be activated on the NVMe storage units 306. If multiple NVMe storage units 306 need to be reset, the RAC 230 may, for each NVMe storage unit 306, read its I/O usage to determine that NVMe storage unit 306 is experiencing minimal usage. In another embodiment, the RAC 230 can obtain the I/O usage information by monitoring for when the I/O usage of the storage unit goes below the specified threshold by querying the storage unit for I/O data throughput that the storage unit is experiencing at an ongoing (e.g., periodic) basis. For example, the RAC 230 may obtain the I/O usage information by issuing a 'get log page' NVMe-MI command to obtain pertinent I/O data, such as "Host Read commands", "Host Write Commands" and "Controller Busy time". If the I/O data from these three NVMe-MI commands do not change for a specified amount of time, (e.g., 5 minutes to 15 minutes), the RAC 230 can consider that a minimal I/O usage is being experienced by that NVMe storage unit 306. The RAC 230 may read and record the I/O data resulting from the 'get log page' command at an ongoing basis (e.g., periodically) to identify any I/O patterns in each NVMe storage units 306, and from that information estimate a zero I/O usage timeslot.

In many cases, the NVMe storage units 306 would generally each be associated with one or more Virtual Drives (VDs) or Virtual Machines (VMs). In such situations, the VM/VD usage patterns of the VDs and/or VMs, namely create and delete, would be used to mark the boundaries for bookkeeping disk I/O usage. That is, the RAC 230 may query the VDs and/or VMs that use the NVMe storage units 306s to determine when the timeslot begins and when it ends when a reset may be performed on the NVMe storage units 306. When NVMe storage units 306 cannot activate the new image without server reboot, the RAC 230 may wait for a zero I/O usage timeslot. As a precautionary measure, the RAC 230 may read the I/O data resulting from the 'get log page' command one or more times to ensure there is no activity on the NVMe storage units 306. At this point, the RAC 230 will issue a NVMe subsystem reset command on the sideband bus (e.g, sideband bus 253) to reset the NVMe storage units 306. This reset will activate the new firmware update image 322 without the need for a reboot of the IHS 200.

In another embodiment, the RAC 230 may communicate with the NVMe driver 316 associated with each NVMe storage unit 306 to pause its operation, and resume normal operations of the NVMe storage unit 306 after the NVMe storage units 306 has been reset. In this embodiment, the RAC 230 may inform the list of NVMe storage units 306 that require a reset to the RAC software agent 302. The RAC software agent 302, in turn, will inform the NVMe driver 316 associated with the NVMe storage units 306 to pause its I/O operations. During this time, the RAC 230 may perform a NVMe subsystem reset, and let the RAC software agent 302 know when the reset of the NVMe storage units 306 has been completed. At this point, the RAC software agent 302 will inform the NVMe driver 3316 to resume I/O operations of the NVMe storage units 306.

Figure 4:
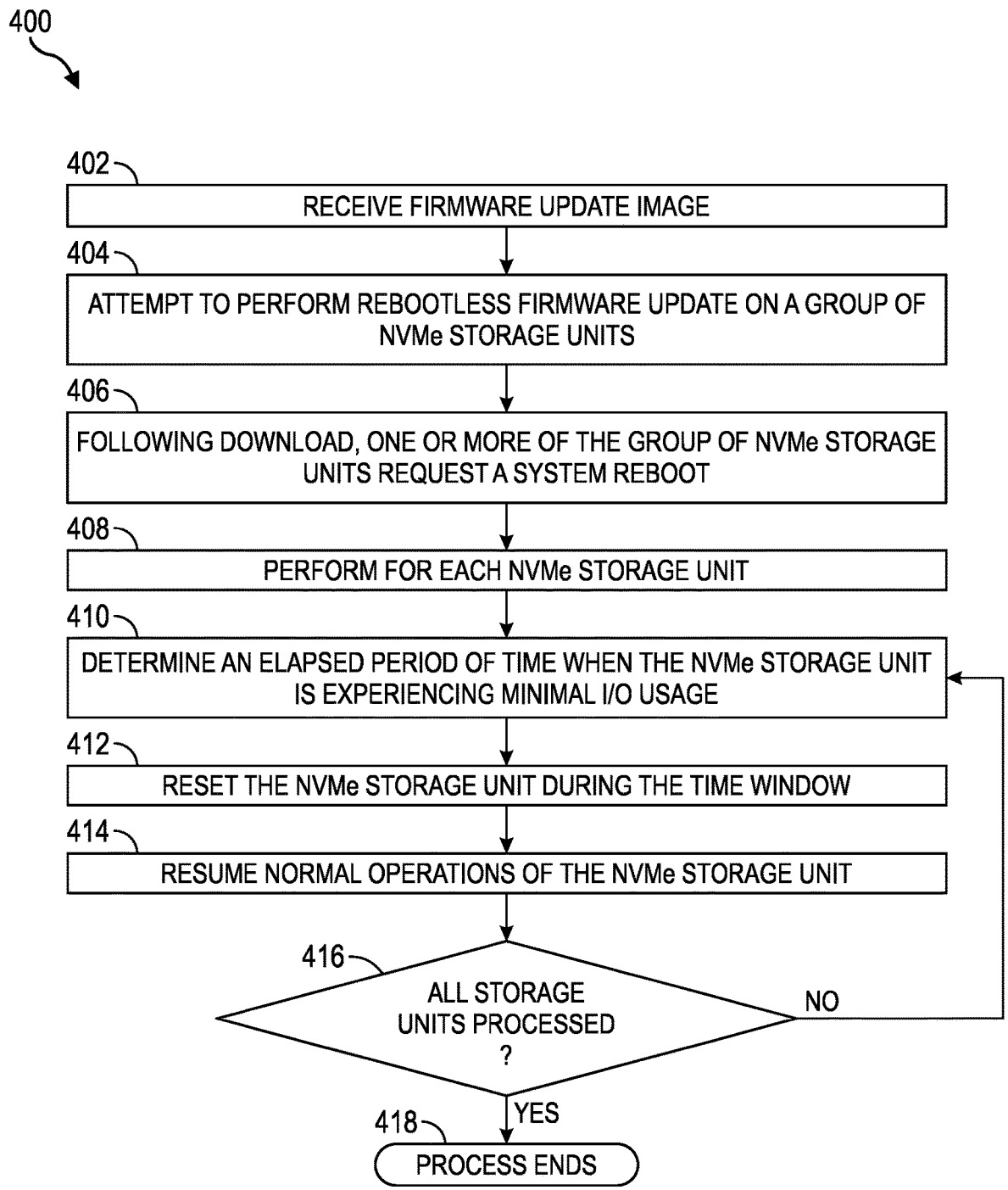
FIG. 4 illustrates an example NVMe-based SSD rebootless firmware update method that may be used to perform rebootless firmware updates when certain NVMe storage units request a system reboot according to one embodiment of the present disclosure.

FIG. 4 illustrates an example NVMe-based SSD rebootless firmware update method 400 that may be used to perform rebootless firmware updates when certain NVMe storage units 306 request a system reboot according to one embodiment of the present disclosure. In one embodiment, the NVMe-based SSD rebootless firmware update method 400 may be performed in whole, or in part, by the RAC 230 as described herein above. In other embodiments, the NVMe-based rebootless firmware update method 400 may be performed by any suitable component or combination of components configured in the IHS 200. Initially, a new firmware update image 322 (e.g., software package or an updated version of an existing software package) is promoted or made available by a provider of the software package and/or the NVMe storage units 306 that the firmware update image 322 supports.

At step 402, the method 400 receives a firmware update image 322. For example, the method 400 may upload a firmware update image 322 into the RAC 230 so that the firmware update can be administered by the RAC 230. In one embodiment, the firmware update image 322 may be a type that conforms to NVMe protocol, which is configured to perform rebootless firmware updates on the NVMe storage units 306. Thereafter at step 404, the method 400 attempts to perform a rebootless firmware update on a group of NVMe storage units 306. For example, the method 400 may identify those NVMe storage units 306 in the IHS 200 that are associated with the firmware update image 322, designate those NVMe storage units 306 as a group, and download the firmware update image 322 to each of those NVMe storage units 306 in the group. In one embodiment, the method 400 may concurrently download the firmware update image 322 to each of the NVMe storage units 306. In other embodiments, the method 400 may attempt to perform the rebootless firmware update on a single NVMe storage unit 306 by downloading the firmware update image 322 to that one NVMe storage unit 306, and attempting to activate that NVMe storage units 306.

Following download, one or more of the group of NVMe storage units 306 request a system reboot at step 406. As a result, the method 400 at step 408, performs steps 410-416 for each NVMe storage unit 306 in the group. It should be appreciated that steps 410-416 described herein may be performed sequentially, independently, or concurrently (e.g., simultaneously) for each NVMe storage unit 306 in the group.

At step 410, the method 400 determines a time window when the NVMe storage unit is experiencing minimal I/O usage. Optionally, the method 400 may receive user input for selecting a suitable time window, such as time window in the firmware update. In one embodiment, the method 400 may monitor the I/O usage of each NVMe storage units 306 to determine when the NVMe storage unit 306 is experiencing minimal usage. For example, the method 400 may issue a 'get log page' NVMe-MI command to obtain I/O data (e.g., "Host Read commands", "Host Write Commands", "Controller Busy time", etc.), and when the I/O data from these NVMe-MI commands do not change for a specified amount of time, the RAC 230 may consider that a minimal I/O usage is being experienced by that NVMe storage unit 306. In another embodiment, the method 400 may use the NVMe driver 316 associated with the NVMe storage units 306 to pause operation of the NVMe storage units 306. In this particular embodiment, the NVMe storage units 306 would be experiencing minimal I/O usage because it would be paused, thus experiencing no I/O usage.

At step 412, the method 400 resets the NVMe storage unit 306 during the time window. In one embodiment, the RAC 230 may perform a NVMe sub-system reset or BPAPI based reset of the NVMe storage units 306. Because there is relatively little I/O usage (e.g., read/write traffic) going through the NVMe storage unit 306, disk corruption that could otherwise be caused by halting a read or write operation that is currently in progress could be alleviated. After the NVMe storage units 306 has been reset, the method 400 resumes normal operation of the NVMe storage units 306 at step 414. For example, if the method 400 has used the 'get log page' NVMe command to monitor and wait for a suitable time window, it may simply wait for the NVMe storage units 306 to begin handling I/O usage during its normal course of operation. If, however, the method 400 used the driver 316 associated with the NVMe storage units 306 to pause operation, it may again use the driver 316 to resume normal operation of the NVMe storage units 306.

At step 416, the method 400 determines whether all of the NVMe storage units 306 that have requested a system reboot have been processed. If additional NVMe storage units 306 require processing, the method 400 continues at step 408 to process additional NVMe storage units 306s; otherwise, the method 400 continues at step 418 in which the process ends.

The aforedescribed method 400 may be performed each time a firmware update image 322 is to be updated on one or more storage units 306 on the IHS 200 or other storage units 306 configured in a different IHS 200. Nevertheless, when use of the rebootless firmware update method 400 is no longer needed or desired, the process ends.

Although FIG. 4 describes an example method 400 that may be performed to transfer firmware update images to storage unit(s) 306 in an IHS 200, the features of the disclosed processes may be embodied in other specific forms without deviating from the spirit and scope of the present disclosure. For example, certain steps of the disclosed method 400 may be performed sequentially, or alternatively, they may be performed concurrently. As another example, the method 400 may perform additional, fewer, or different operations than those operations as described in the present example.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   a storage unit that is configured to be updated with firmware at an ongoing basis, the storage unit conforming to a Non-Volatile Memory Express (NVMe) specification;
   at least one processor; and
   a memory coupled to the at least one processor, the memory having program instructions stored thereon that, upon execution by the processor, cause the IHS to:
   receive a firmware update image associated with the storage unit, the firmware update image is configured to perform rebootless firmware updates on the storage unit;
   receive an indication that the storage unit requires a reboot of the IHS;
   identify a time window for a minimal input/output (I/O) usage by monitoring a Virtual Drive (VD) or a Virtual Machine (VM) that is using the storage unit for a usage pattern of the storage unit; and
   when the NVMe storage unit is experiencing the minimal I/O usage, reset the storage unit using the firmware update image.

2. The IHS of claim 1, wherein the instructions, upon execution, cause the IHS to determine when the storage unit is experiencing minimal I/O usage by monitoring for when the I/O usage of the storage unit goes below a specified threshold.

3. The IHS of claim 2, wherein the instructions, upon execution, cause the IHS to receive user input for selecting the specified threshold by a user.

4. The IHS of claim 2, wherein the instructions, upon execution, cause the IHS to monitor for when the I/O usage of the storage unit goes below the specified threshold by querying the storage unit for I/O data throughput that the storage unit is experiencing at an ongoing basis.

5. The IHS of claim 1, wherein the instructions, upon execution, cause the IHS to:
   communicate with a NVMe driver associated with the storage unit to pause operation of the storage unit; and
   re-activate the storage unit via the NVMe driver to resume normal operations of the storage unit after the storage unit has been reset.

6. The IHS of claim 5, wherein the instructions, upon execution, cause the IHS to reset the storage unit by issuing a NVMe subsystem reset command using a sideband communication link that is independent of the operation of the OS.

7. The IHS of claim 1, wherein the instructions, upon execution, cause the IHS to communicate with the NVMe driver using a software agent that is executed on an Operating System (OS) of the IHS.

8. The IHS of claim 1, wherein the instructions, upon execution, cause the IHS to:
   download the firmware update image to the storage unit; and
   when attempting to activate the downloaded firmware update image, receive the indication that the storage unit requires a reboot of the IHS.

9. The IHS of claim 1, wherein the storage unit comprises a Solid State Drive (SSD) storage unit.

10. A Non-Volatile Memory Express (NVMe)-based rebootless firmware update method comprising:
    receiving a firmware update image associated with a storage unit, the firmware update image is configured to perform rebootless firmware updates on the storage unit that is configured to be updated with firmware at an ongoing basis, the storage unit conforming to a NVMe specification;

receiving an indication that the storage unit requires a reboot of an Information Handling System (IHS) in which the storage unit is configured;

identifying a time window for a minimal input/output (I/O) usage by monitoring a Virtual Drive (VD) or a Virtual Machine (VM) that is using the storage unit for a usage pattern of the storage unit; and when the NVMe storage unit is experiencing the minimal I/O usage, resetting the storage unit using the firmware update image.

11. The NVMe-based rebootless firmware update method of claim 10, further comprising determining when the storage unit is experiencing minimal I/O usage by monitoring for when the I/O usage of the storage unit goes below a specified threshold.

12. The NVMe-based rebootless firmware update method of claim 11, further comprising receiving user input for selecting the specified threshold by a user.

13. The NVMe-based rebootless firmware update method of claim 11, further comprising monitoring for when the I/O usage of the storage unit goes below the specified threshold by querying the storage unit for I/O data throughput that the storage unit is experiencing at an ongoing basis.

14. The NVMe-based rebootless firmware update method of claim 10, further comprising:

communicating with a NVMe driver associated with the storage unit to pause operation of the storage unit; and re-activating the storage unit via the NVMe driver to resume normal operations of the storage unit after the storage unit has been reset.

15. The NVMe-based rebootless firmware update method of claim 14, further comprising resetting the storage unit by issuing a NVMe subsystem reset command using a sideband communication link that is independent of the operation of the OS.

16. The NVMe-based rebootless firmware update method of claim 10, further comprising communicating with the NVMe driver using a software agent that is executed on an Operating System (OS) of the IHS.

17. The NVMe-based rebootless firmware update method of claim 10, further comprising:

downloading the firmware update image to the storage unit; and when attempting to activate the downloaded firmware update image, receiving the indication that the storage unit requires a reboot of the IHS.

18. A memory storage device having program instructions stored thereon that, upon execution by one or more processors of an Information Handling System (IHS), cause the IHS to:

receive a firmware update image associated with a storage unit, the firmware update image is configured to perform rebootless firmware updates on the storage unit, the storage unit conforming to a Non-Volatile Memory Express (NVMe) specification;

receive an indication that the storage unit requires a reboot of the IHS;

identify a time window for a minimal input/output (I/O) usage by monitoring a Virtual Drive (VD) or a Virtual Machine (VM) that is using the storage unit for a usage pattern of the storage unit; and when the storage unit is experiencing the minimal I/O usage, reset the storage unit using the firmware update image.

* * * * *